United States Patent [19]

Meyer et al.

[11] Patent Number: 4,727,521

[45] Date of Patent: Feb. 23, 1988

[54] SEISMIC AMPLIFIER MEANS AND METHOD

[75] Inventors: Herbert J. Meyer, Bellaire; Donald L. Howlett, Kingwood, both of Tex.

[73] Assignee: Texaco Inc., White Plains, N.Y.

[21] Appl. No.: 821,712

[22] Filed: Jan. 23, 1986

[51] Int. Cl.$^4$ .............................................. G01V 1/16
[52] U.S. Cl. ...................................... 367/67; 367/65; 367/66
[58] Field of Search .............................. 367/65, 66, 67

[56] References Cited

U.S. PATENT DOCUMENTS 3,947,806  3/1976  Corkhill et al. ................ 367/67
4,194,163  3/1980  Gillespie ........................ 367/66

*Primary Examiner*—Nelson Moskowitz
*Assistant Examiner*—Ian J. Lobo
*Attorney, Agent, or Firm*—Robert A. Kulason; James J. O'Loughlin; Ronald G. Gillespie

[57] ABSTRACT

The seismic amplifier includes an amplifying circuit which amplifies an analog signal to provide an amplified analog signal. The amplified analog signal is converted to digital signals. A controlled network connected to the amplifier circuit controls the gain of the amplifier circuit in a manner so that the gain for a current seismic operation, except for an initial seismic operation, is determined during the next previous vibration seismic operation.

12 Claims, 1 Drawing Figure

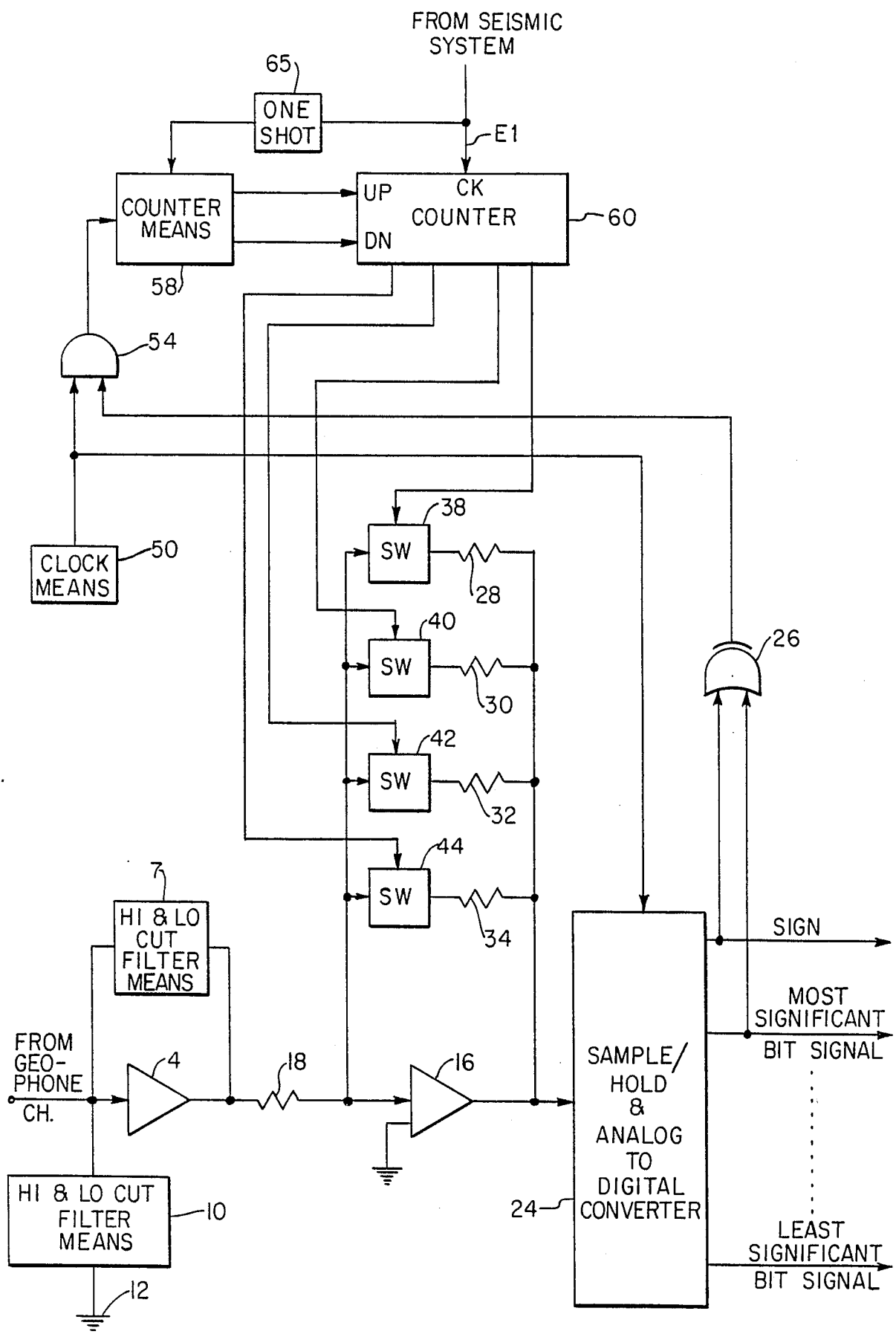

SEISMIC AMPLIFIER MEANS AND METHOD

BACKGROUND OF THE INVENTION

Field of the Invention

The present invention relates to the seismic apparatus and methods in general and, more particularly, to seismic amplifying means and methods.

SUMMARY OF THE INVENTION

The seismic amplifier includes an amplifying circuit which amplifies an analog signal to provide an amplified analog signal. The amplified analog signal is converted to digital signals. A controlled network connected to the amplifier circuit controls the gain of the amplifier circuit in a manner so that the gain for a current seismic operation, except for an initial seismic operation, is determined during the next previous vibration seismic operation.

The objects and advantages of the invention will appear more fully hereinafter from a consideration of the detailed description which follows, taken together with the accompanying drawing wherein one embodiment of the invention is illustrated by way of an example. It is to be expressly understood, however, that the drawing is for illustration purposes only and is not to be construed as defining the limits of the invention.

DESCRIPTION OF THE DRAWING

The FIGURE is a partial simplified block diagram and a partial schematic of a seismic amplifier constructed in accordance with the present invention.

DESCRIPTION OF THE INVENTION

The present invention relates to an improvement to vibration type seismic evaluations of earth formations. The present invention reduces the cost of apparatus for such operations by eliminating the need for a floating point amplifier and noise reduction apparatus as well as reduced bit requirements. It is well suited for telemetry operations involving very large numbers of recording channels. In that application the present invention would be located physically near the geophones.

Conventionally, a vibration seismic operation involves the use of a truck which induces vibrations into an earth formation by a pad which is pushed against the earth in accordance with a predetermined program. The frequency of the vibrations is swept through a range of frequencies typically from 10 Hz up to 100 Hz. The time duration for each sweep being approximately 10 to 20 seconds. At each shot point, the sweep may be repeated several times. The resulting seismic records are algebraically added. However, the vibration type seismic activity generates a weak energy signal. The present invention amplifies that signal in an economic manner.

The vibration truck itself and the control system are involved in the recording of the data in a conventional manner. The vibration operations are part of the prior art and are not part of the present invention but will be referred to as needed.

For a more convenient understanding of the present invention, the words, "seismic shot" hereinafter will refer to a plurality of individual vibration operations which are algebraically summed. A seismic vibration truck may be at one location for all the vibration of a seismic shot or the truck may be moved a predetermined distance from the site of the previous vibration during a seismic shot as is sometimes done in conventional seismic vibration usage. A seismic recording truck contains the seismic recording system.

Referring to FIG. 1, there is shown a channel amplifier which may be used with each geophone array. The amplifiers may be located in the field with the geophone arrays or located in the seismic recording truck with the other seismic processing equipment. The signals for one channel are provided to a preamplifier 4 having a high and low cut filter means 7 in a feedback loop and another high and low cut filter means 10 connecting the input of preamplifier 4 to ground 12. Preamplifier 4 provides an output signal to another amplifier 16 by way of a resistor 18. The output of amplifier 16 is provided to a sample/hold and analog to digital converter 24 (hereafter referred to as converter 24) which provides a plurality of digital signals, representative of the magnitude of the analog signal provided to it, including a most significant bit signal and a least significant bit signal shown. Converter 24 also provides a sign representative of the polarity of the analog signal at the time of conversion. The signals from converter 24 are recorded in a conventional manner by apparatus not shown. The gain of pre-amp 16, controlled as hereinafter explained, by an up-down counter 60 is also recorded by that same apparatus.

The signals from converter 24 are in the TWOs complement form. The sign bit and the most significant bit signals are provided to an Exclusive OR gate 26 which in turn provides an enabling signal whenever the output of converter 24 is over one-half of full scale of converter 24.

The gain of amplifier 16 is controlled by the relationship of one of a plurality of feedback resistors 28, 30, 32, and 34 and input resistor 18. The feedback resistor is selected by operation of a switch of a plurality of switches 38, 40, 42, and 44 which are controlled by control signals hereinafter explained. One set of gain values may be 8, 4, 2 and 1 respectively. Where a gain of 1 equals to 6 db, and a gain of 8 equals to 48 db.

Converter 24 receives clock pulses from a clock means 50. Clock means 50 also provides the clock pulses to an AND gate 54 connected to Exclusive OR gate 26 and passes the clock pulses when converter 24 provides an enabling signal. It should be noted that Exclusive OR gate 26 is necessary because converter 24 is providing its output in the TWOs complement format. If converter 24 was providing its output in the ONEs complement format, Exclusive OR gate 26 is not used. The most significant bit signal from converter 24 is then provided directly to AND gate 54. Counter means 58 counts the pulses provided by AND gate 54 and provides control signals to the up and down inputs of up/down counter 60 to control the counting direction of counter 60. Counter means 58 includes logic that causes it to provide an enabling 'up' signal or an enabling 'down' signal or no enabling signal to counter 60.

A pulse E1 is provided once after each shot point by the seismic system in the recording truck to the clock input of counter 60 and to the one shot multivibrator 65 which acts as a time delay. One shot 65, after the time delay, in turn provides a pulse to the clear input of counter means 58 thereby clearing counter means 58.

In operation, by way of example, the signal from the geophone channel is amplified via amplifier 16 and digitized by the A/D converter 24. If the amplitude of the signal exceeds one half of the full amplitude range of the A/D converter 24, the most significant bit and the sign bit of converter 24 will enable the AND gate 54 via the exclusive OR gate 26. Counter means 58 counts up every time AND gate 54 is enabled by the exclusive OR gate 26 and clock means 50 throughout the duration of the shot point. Thus counter means 58 counts the number of times the amplified geophone signal exceeded one half of the full scale of the A/D converter 24 during a shot. Clock means 50 provides one clock for each sample taken. At the end of a shot the seismic system provides a pulse E1 to the clock input of counter 60, and a clear pulse to counter means 58 via the one shot 65. Counter means 58 has internal logic which determines whether counter 60 will count up, count down or not change for each E1 pulse. The decision for that count depends on whether the gain of amplifier 16 was sufficient during the previous shot point, or a change in gain is desired.

For the first shot point, counter 60 is set to its lowest gain so that switch 44 is energized. If the amplified signal level during the previous shot point was not sufficient, counter means 58 will enable counter 60 to count up, when E1 pulse is provided. Counter 60 will then enable switch 42, and amplifier 16 will amplify the geophone signal during the next shot point to a higher level. If the amplified signal level during the previous shot point was too high, counter means 58 will enable counter 60 to count down, when E1 pulse is provided. When the amplified geophone signal was neither too high nor too low, no change in counter 60 will occur, and the gain of amplifier 16 will not change. The maximum gain level is 15 when all switches are energized and the least gain level is 1 when only switch 34 is energized.

It should be noticed that a sudden burst in the amplitude of the geophone signal level, which is considered as noise, will be clipped by the A/D converter (or even by the amplifier). This is considered as the noise reduction method.

The present invention provides a low cost amplification alternative to the floating point amplifier in seismic vibration or similar operations. The present invention may be used on one-for-one basis for each geophone channel, i.e. the number of channel amplifiers equals the number of geophone channels. Variations on this basic approach involve the use of a multiplexer which could be inserted at the input to the A-D converter 24 or at input to the preamplifier. This would permit an increase in the number of channels with relatively little hardware.

What is claimed:

1. A seismic amplifier for use with a vibration type seismic system having geophones and providing a shot point pulse at the end of each shot point comprising:

means for amplifying an analog seismic signal from the geophones to provide an amplified analog signal;

converter means connected to the amplifier means for converting the amplified analog signal to digital signals;

receiver means for receiving shot point pulses from the seismic system; and control means connected to the receiver means, to the amplifier means and to the converter means for controlling the gain of the amplifier means in accordance with at least one of the digital signals and a received shot point pulse in a manner so that the gain for a current shot point was determined during the next previous shot point; wherein the control means include:

counter means connected to the receiver means for being reset by a received shot point pulse from the receiver means and for counting pulses, and providing a first enabling signal when its count is less than a predetermined range of counts, providing no enabling signal when its count is within the predetermined range of counts, and providing a second enabling signal when its count is greater than the predetermined range of counts, pulse means connected to the counter means and to the converter means for providing pulses to the counter means during a shot point each time the output from the converter means is over half of the converter means full scale and for providing pulses to the converter means to control the converting of the analog signal to to digital signals, and control signal means connected to the receiver means, to the amplifier means and to the counter means in accordance with an enabling signal or the absence of an enabling signal and the shot point pulse from the receiver system so as to control the gain of the amplifier means.

2. A seismic amplifier as described in claim 1 in which the amplifier means includes:

pre-amp and filter means for receiving an analog signal from the geophones for filtering and amplifying the analog signal at a predetermined gain to provide an output signal, and variable gain amplifier means connected to the pre-amp and filter means to the converter means and to the control signal means for amplifying the output signal from the pre-amp and filter means in accordance with the control signals to provide the amplified signal to the converter means.

3. A seismic amplifier as described in claim 2 in which the control signal means is an up-down counter having an up input and a down input connected to the counter means, whose enabling signals control the counting direction of the up-down counter, a clock input connected to the receiver means and a plurality of outputs connected to the variable gain amplifier so that a shot point pulse from the receiver means will change the count in the up-down counter in a direction dependent upon which input of the up input and the down input receives an enabling signal from the counter means and does not change the count in the up-down counter when the counter means is not providing an enabling signal and that the plurality of outputs provide the control signals in accordance with the count in the up-down counter.

4. A seismic amplifier as described in claim 3 in which the counter means includes a counter having a clock input connected to the pulse means, a reset input and two outputs connected to the up-down counter, said counter counts the pulses appearing at its clock input, provides an enabling signal at one output when its count is less than the predetermined range of counts and provides an enabling signal at the other output when its count is greater than the predetermined range of counts, and delay means connected to the reset input of the counter and to the receiver means for providing a delayed shot point pulse to the reset input of the counter so as to reset the counter a predetermined time interval after the occurrence of a shot point pulse.

5. A seismic amplifier as described in claim 4 in which the variable gain amplifier means includes:
   an input resistor having a predetermined resistance valve and having one end connected to the output of the pre-amp and filter means,
   an operational amplifier having an input, connected to the unconnected end of the input resistor, and an output connected to the converter means, and
   feedback means connected to the outputs of the up-down counter and connecting the input of the operational amplifier to the output of the operational amplifier for providing a feedback resistance for the operational amplifier in accordance with the control signals provided by the up-down counter.

6. A seismic amplifier as described in claim 5 in which the feedback means includes:
   a plurality of switches, each switch being connected to a corresponding output of the up-down counter, and a plurality of resistors, having different resistances, connected in such a manner that each switch and a corresponding resistor is connected in series between the input and the output of the operational amplifier.

7. A seismic amplifier as described in claim 6 in which the converter means provides the digital signals and the pulse means includes:
   clock means connected to the converter means for providing clock pulses, and
   an AND gate connected to the converter means, to the clock means and to the clock input of the counter and providing clock pulses from the clock means to the counter means in accordance with the most significant bit signal from the converter means.

8. A seismic amplifier as described in claim 6 in which the converter means provides the digital signals, including a sign signal and a most significant bit signal, in the TWOs complement format and the pulse means includes an exclusive OR gate receiving the sign signal and the most significant bit signal from the converter means and providing an output signal at a high logic level in accordance with received signals when the digital signals represent a value greater than half scale of the converter means and at a logic level when the digital signals represent a value not greater than half scale of the converter means,
   clock means connected to the converter means for providing clock pulses, and
   an AND gate connected to the exclusive OR gate, to the clock means and to the counter means and passing the clock pulses from the clock means to the counter means when the output signal from the exclusive OR gate is at a high logic level and not passing the clock pulses when the output signal from the exclusive OR gate is at a low logic level.

9. A method of amplifying an analog seismic signal derived from use of a vibration type seismic system having geophones and which provides a shot point pulse at the end of each shot point comprising the steps of:
   amplifying the analog seismic signal from the geophones with an amplifier means to provide an amplified analog signal,
   converting the amplified analog signal to digital signals with an analog-to-digital converter,
   receiving shot point pulses from the seismic system,
   controlling the gain of the amplifier means in accordance with at least one of the digital signals and a received shot point pulse in a manner so that the gain for current shot point was determined during the next previous shot point, in which the control step includes:
   providing the pulses to a counter during a shot point each time the digital signals from the converter means represents a value over half of the converter's full scale value, to the receiver means,
   counting the provided pulses with the counter,
   providing a first enabling signal when the count in the counter is less than a predetermined range of counts,
   providing a second enabling signal when the count in the counter is greater than the predetermined range of counts,
   providing control signals to the amplifier means in accordance with an enabling signal or the absence of an enabling signal and the shot point pulse so as to control the gain of the amplifier means.

10. A method as described in claim 9 in which the amplifying step includes:
    filtering and amplifying the analog signal from the geophones at a predetermined gain to provide an output signal, and
    amplifying the output signal from the pre-amp and filter means with a variable gain amplifier whose gain is set in accordance with the control signals to provide the amplified signal to the converter.

11. A method as described in claim 10 in which the control signal step includes:
    counting shot point pulses with an up-down counter when the counter is providing an enabling signal, and in a direction determined by the enabling signal,
    providing the control signals in accordance with the count in the up-down counter.

12. A method as described in claim 11 in which the amplifying step using the variable gain amplifier includes:
    providing input resistance for the variable gain amplifier,
    providing variable feedback resistance for the variable gain amplifier, and
    selecting a value for the feedback resistance in accordance with the control signals so as to control the gain of the variable gain amplifier.

* * * * *